UNITED STATES PATENT OFFICE 2,436,699

NITROGENOUS DIACYL-GLYCERO-PHOSPHATES

William Gordon Rose, Berkeley, Calif., assignor to the United States of America, as represented by the Secretary of Agriculture No Drawing. Application June 12, 1947, Serial No. 754,256

15 Claims. (Cl. 260—403)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to esters of diacyl-glycerophosphoric acids.

More particularly, this invention relates to the preparation of aminoethyl esters of diacyl-glycerophosphoric acids wherein the acyl groups are aliphatic and contain at least 8 carbon atoms. These compounds may be illustrated by the following formulae:

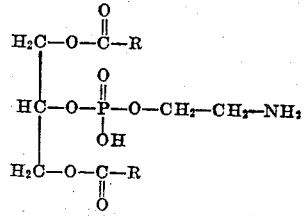

(aminoethyl ester of alpha, gamma-diacyl glycerophosphoric acid) and

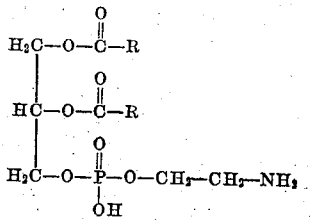

(aminoethyl ester of alpha, beta-diacyl glycerophosphoric acid) wherein

represents an aliphatic acyl radical containing at least 8 carbon atoms.

Cephalin is a naturally occurring mixture of aminoethyl esters of diacyl-glycerophosphoric acids. Thus, these esters can also be named with respect to their relationship to cephalin. For instance, the following compound can be named the aminoethyl ester of alpha, gamma-dipalmitoglycerophosphoric acid or alpha, gamma-dipalmitocephalin:

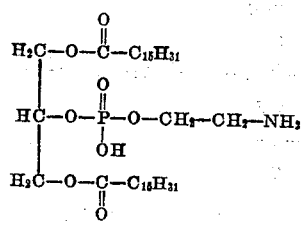

and the following compound can be named the aminoethyl ester of alpha, gamma-distearoglycerophosphoric acid or alpha, gamma-distearocephalin.

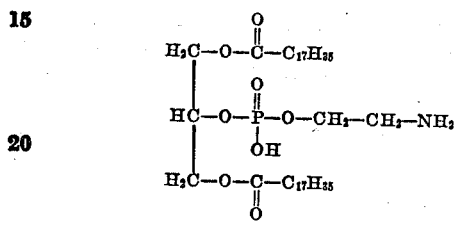

This invention relates with further particularity to the preparation of novel compounds, namely, carbobenzoxyaminoethyl esters of diacyl glycerophosphoric acids wherein the acyl groups are aliphatic and contain at least 8 carbon atoms. These compounds may be illustrated by the formulae:

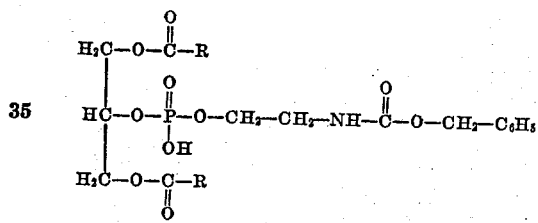

(carbobenzoxyaminoethyl ester of alpha, gamma-diacylglycerophosphoric acid) and

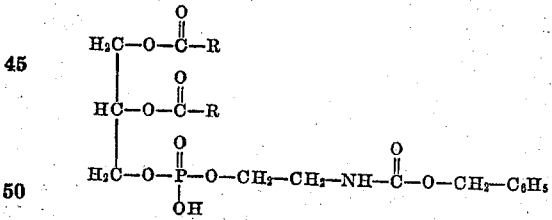

(carbobenzoxyaminoethyl ester of alpha, beta-diacylglycerophosphoric acid) wherein

represents an aliphatic acyl radical containing at least 8 carbon atoms.

to the phosphorus atom whereby the carbobenzoxyaminoethyl ester of the diacyl-glycerophosphoric acid is produced. This material is then cleaved by reaction with phosphonium iodide to produce the aminoethyl ester of the diacyl-glycerophosphoric acid. The reactions can be illustrated by the following equations:

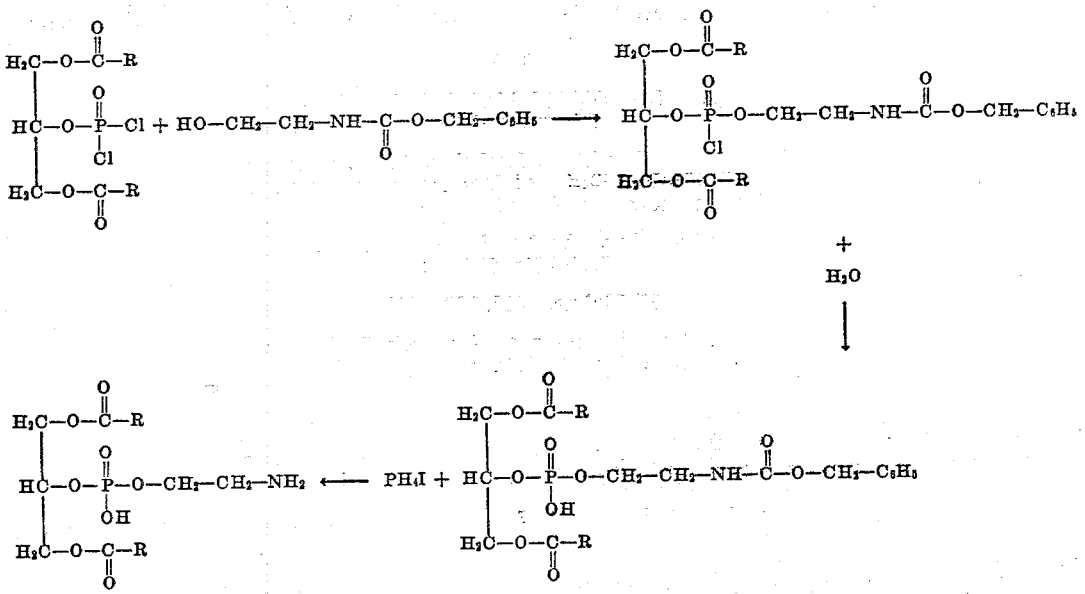

These novel compounds can also be named with respect to their relationship to cephalin. Thus, for instance, the carbobenzoxyaminoethyl ester of alpha, gamma-dipalmitoglycerophosphoric acid can be referred to as alpha, gamma-dipalmitocarbobenzoxycephalin.

Accordingly, an object of this invention is to prepare aminoethyl esters of diacylglycerophosphoric acids wherein the acyl groups are aliphatic and contain at least 8 carbon atoms.

Another object of this invention is to prepare carbobenzoxyaminoethyl esters of diacyl-glycerophosphoric acids wherein the acyl groups are aliphatic and contain at least 8 carbon atoms.

A further object of this invention is to provide novel compounds, namely, carbobenzoxyaminoethyl esters of diacyl-glycerophosphoric acids wherein the acyl groups are aliphatic and contain at least 8 carbon atoms.

Further objects and advantages will be apparent from the description of the invention.

Methods of preparing the aminothyl esters are known but are arduous, expensive and give poor yields. One method involves heating distearin with phosphoric anhydride and adding ethanolamine carbonate to the reaction product. This procedure has been found to be unsatisfactory because of reaction between the amine group of the ethanolamine and the diacyl-glycerophosphoric anhydride to form a diacyl-glycerophosphoric acid amide instead of the desired ester. Another method involves the heating together of bromethylamine picrate and the monosilver salt of dipalmitoglycerophosphoric acid. This procedure gives very poor yields probably due to formation of piperazine derivatives.

I have found that the aminoethyl esters can be obtained in good yield by the reaction of a diacyl-glycerophosphoryl chloride with carbobenzoxyaminoethanol. The resulting compound, carbobenzoxyaminoethyl ester of diacyl-glyceromonochlorophosphoric acid, is subjected to a limited hydrolysis to remove the chlorine atom attached In the above formulae,

represents an aliphatic acyl radical containing at least 8 carbon atoms.

The following example, which describes the preparation of alpha, gamma-dipalmitocarbobenzoxycephalin (A) and of alpha, gamma-dipalmitocephalin (B), discloses particular steps and conditions within the scope of this invention, but it is to be understood that this example is given only by way of illustration and not limitation.

(A) *Preparation of alpha, gamma-dipalmitocarbobenzoxycephalin*

In a two-necked flask provided with a dropping funnel and a stirrer adapted to scrape the bottom of the flask, and surrounded by a water-bath maintained at 10°–15° C., was placed 3.06 grams of phosphorus oxychloride. To this were added 25 ml. of dry pyridine and 25 ml. of purified chloroform. The stirrer was started and 11.4 grams of alpha, gamma-dipalmitin in 50 ml. of chloroform was added during a period of 30 minutes. The reaction mixture was stirred for 30 minutes at 30°–35° C. and 3.9 grams of carbobenzoxyaminoethanol in 10 ml. chloroform was added at 10°–15° C. during a period of 20 minutes. This reaction mixture was stirred for 1 hour at room temperature and for 30 minutes at 35°–40° C. to complete the reaction. After cooling to 25° C., 0.4 ml. water in 4 ml. pyridine was added to effect a limited hydrolysis. After stirring for 15 minutes at 25° C. to complete the limited hydrolysis, most of the chloroform was removed in vacuum. Ice, water and ether were added and the mixture agitated in a separatory funnel. The aqueous layer which was badly emulsified was drawn off and acidified with 2 N hydrochloric acid which broke the emulsion. The ether layer that separated was returned to the main ether solution which was then washed with 4 portions of 0.5 N hydrochloric acid and with water. Sometimes emulsions formed which were separated by centrifuging in capped centrifuge bottles. The ether solution was filtered through cotton and left at 5° C. overnight. Filtration gave 1.5 grams of a by-product that melted at 69°–77° C. This was not further investigated. The ether filtrate was left at —18° C. for 6 hours, then filtered at this temperature giving 11.4 grams of material that sintered at 33° C. and melted at 40°–46° C. It was purified by warming with 250 ml. of methanol, decanting the solution from a small amount of molten insoluble material, chilling the solution to 0° C. and filtering. The resulting pasty product was recrystallized from 100 ml. ether at —18° C. Yield, 7.2 grams of alpha, gamma-dipalmitocarbobenzoxycephalin, M. P. 39.5°–40° C.

Analysis: Calcd. for $C_{45}H_{80}O_{10}PN$: C, 65.42; H, 9.76; P, 3.75; N, 1.70. Found: C, 64.88, 64.88; H, 9.86, 9.93; P, 3.77; N (Dumas), 1.82, 1.82.

(B) *Preparation of alpha,gamma-dipalmitocephalin*

Four and eight-tenths grams of alpha,gamma-dipalmitocarbobenzoxycephalin, prepared as described above, was dissolved in 75 ml. glacial acetic acid and 5.0 grams phosphonium iodide added in small portions, with frequent stirring. The reaction mixture was left at 40° C. overnight, protected from atmospheric moisture with a drying tube. Five milliliters of alcohol was then added to decompose the excess phosphonium iodide, 200 ml. water was then added, followed by the addition of ether, and the mixture was agitated in a separatory funnel. The water layer was removed and the interface layer was transferred to a funnel and washed with ether. This product weighed 1.75 g., sintered at 135° C., and melted at 178°–193° C. Recrystallization from absolute ethanol gave a product (alpha,gamma-dipalmitocephalin) that melted at 193°–194° C.

Analysis: Calcd. for $C_{37}H_{74}O_8NP$: C, 64.22; H, 10.78; N, 2.02; P, 4.48. Found: C, 63.96; H, 10.78; N, 2.06; P, 4.43.

As set forth above, the first step in the process involves the reaction of carbobenzoxyaminoethanol with a diacylglycerophosphoryl chloride. As the latter reactant, many different compounds can be used wherein the acyl radicals are aliphatic and contain at least 8 carbon atoms. The acyl radicals can be attached at the alpha and gamma positions of the glycerine nucleus, in which case the phosphoryl chloride group is at the beta position; or, the acyl groups can be attached at the alpha and beta positions, in which case the phosphoryl chloride group is attached at the gamma position.

These diacyl-glycerophosphoryl chlorides are most conveniently prepared by reacting a diacyl ester of glycerine with phosphorus oxychloride. For example, by reacting alpha,gamma-dipalmitin with phosphorus oxychloride in the presence of pyridine, alpha,gamma-dipalmitoglycerophosphoryl chloride can be prepared. Thus, one can employ as the diacyl-glycerophosphoryl chloride reactant the phosphorus oxychloride reaction product with any of the following diacyl esters of glycerine, i. e.: alpha,gamma-dicaprylin; alpha,beta-dicaprylin, alpha,gamma-dipelargonic ester of glycerine; alpha,beta-dipelargonic ester of glycerine; alpha,gamma-dicaprin; alpha,beta-dicaprin; alpha,gamma-diundecylic ester of glycerine; alpha,beta-diundecylic ester of glycerine; alpha,gamma-dilaurin; alpha,beta-dilaurin; alpha,gamma-ditridecylic ester of glycerine; alpha,beta-ditridecylic ester of glycerine; alpha,gamma-dimyristin; alpha,beta-dimyristin; alpha,gamma-dipentadecylic ester of glycerine; alpha,beta-dipentadecylic ester of glycerine; alpha,gamma-dipalmitin; alpha,beta-dipalmitin; alpha,gamma-dimargarin; alpha,beta-dimargarin; alpha,beta-distearin; alpha,gamma-dinondecylic ester of glycerine; alpha,gamma-diarachadin; alpha,gamma-diolefin; alpha,beta-diolein; alpha,gamma-dielaidin; alpha,beta-dielaidin; alpha,gamma-dipalmitolein; alpha,beta-dipalmitolein; alpha,gamma-dilinolein; alpha,beta-dilinolein, and so forth.

Further, it is possible to use glycerine esters wherein the two acyl groups are dissimilar, for instance, alpha-stearic, beta-palmitic ester of glycerine; alpha-lauric, gamma-palmitic ester of glycerine; alpha-stearic, gamma-oleic ester of glycerine; alpha-palmitic, gamma-linoleic ester of glycerine, and so forth.

Further, if it is not desired to prepare an individual final compound but mixtures, one can employ mixtures of different diesters of glycerine. For instance, one could employ the mixtures of diglycerides formed by heating glycerine and a catalyst with a triglyceride. Thus, mixtures of diglycerides suitable for use in this process could be prepared by heating glycerine with a catalyst and with coconut oil, palm-kernel oil, olive oil, tallow, suet, cottonseed oil, peanut oil, lard, whale oil, sardine oil, corn oil, soybean oil, and so forth. Mixtures of diglycerides can also be prepared by reacting an excess of glycerine, in the presence of an esterification catalyst, with mixtures of homologous fatty acids, such as the mixture of fatty acids produced by hydrolysis of any of the fats or oils listed above.

It is preferred to prepare the carbobenzoxyaminoethanol by the following technique:

Twenty-four and four-tenths grams of freshly distilled ethanolamine in 50 ml. water was placed in a 3-necked flask provided with a stirrer adapted to scrape the bottom of the flask. The flask was surrounded with ice water, and 68 grams of carbobenzoxychloride and 100 ml. of 4 N sodium hydroxide were added during the course of 40 minutes. Stirring was continued for 30 minutes at ice temperature and for 30 minutes at room temperature. The reaction mixture was then made just acid to Congo red paper with hydrochloric acid and extracted with ether. The ether layer was washed twice with 0.5 N hydrochloric acid and with water, dried with magnesium sulfate and left overnight at —30° C. Filtration gave 35.2 grams of crystalline product melting at 62.0°–62.5° C. and setting at 61° C. Recrystallization from ether at —30° C. did not alter the melting point. The first ether filtrate was concentrated and added to the filtrate from the second crystallization. Cooling this to —30° C. gave 12.3 grams, which also melted at 62.0°–62.5° C.

Analysis: Calcd. for $C_{10}H_{13}O_3N$: C, 61.52; H, 6.71; N, 7.18. Found: C, 61.41; H, 6.35; N (Dumas), 7.18.

In the reaction of the diacyl glycerine ester with phosphorus oxychloride to prepare the diacyl-glycerophosphoryl chloride, it is necessary to add a hydrogen chloride acceptor to the reaction mixture. For this purpose, pyridine, quinoline, dimethyl aniline or other tertiary amines are suitable. The temperature of the reaction should be kept low. It has been found that temperatures from about 10° C. to about 35° C. are suitable. Preferably, the reaction should be conducted at the lower temperature, about 10°–15° C., and then heating to about 30°–35° C. for a short time to insure complete reaction. The diacyl-glycerine ester and phosphorus oxychloride should be employed in approximately equimolar proportions. It is preferable to employ a solvent in this reaction. Organic solvents such as chloroform, dichloromethane, benzene, and so forth, are suitable. Any other inert liquid which will dissolve the diacyl-glycerine ester-phosphorus oxychloride complex and the tertiary amine hydrochloride can be used.

It has been found that the diacyl-glycerophosphoryl chloride need not be isolated from the reaction mixture but the carbobenzoxyaminoethanol can be reacted with it in situ. In the reaction of the diacyl-glycerophosphoryl chloride with the carbobenzoxyaminoethanol, it is necessary to employ a hydrogen chloride-acceptor (quinoline, pyridine, dimethylaniline, or other tertiary amine). It has been found to be convenient to add an excess of the hydrogen chloride-acceptor in the first reaction (diacyl-glycerine ester and phosphorus oxychloride) whereby sufficient acceptor will remain in the reaction mixture for the second reaction (diacyl-glycerophosphoryl chloride and carbobenzoxyaminoethanol). In regard to the latter reaction, the same temperature, proportions, and solvents are applicable as to the former reaction.

In the hydrolysis step involving the removal of the chlorine atom from the complex carbobenzoxyaminoethyl ester of diacyl-glyceromonochlorophosphoric acid, the amount of water is not critical. At least an equimolar proportion of water should be added but an excess will not be disadvantageous. The temperature during this step should be kept at about 25° C. or less to prevent hydrolysis of the ester linkages. No solvent is necessary in the hydrolysis but a solvent such as pyridine can be used, if desired, to assist in transfer of water to the mixture.

The expression "limited hydrolysis," as used herein, means a controlled hydrolysis whereby only the chlorine atom on the phosphorus atom is hydrolyzed and the ester linkages are not affected.

In the cleavage step, phosphonium iodide (PH4I) is heated with the carbobenzoxycephalin. One mol of the carbobenzoxycephalin requires at least one mol of phosphonium iodide; preferably an excess of the latter, 2 to 5 mols, is used. The reaction proceeds favorably at temperatures from about 25° C. to about 50° C. It is preferred to use an inert solvent such as acetic acid or dioxane to promote contact between the reactants.

It is also possible to effect the cleavage by reaction of the carbobenzoxycephalin with sodium in liquid ammonia, but the product so formed is difficult to purify.

The aminoethyl esters produced according to the described process can be used to replace lecithin in a variety of pharmaceutical preparations and cosmetics where they are useful as emulsifying and skin-softening agents. These products are also useful as antiblushing agents in chocolates and as water-binding and dispersing agents in oleomargarine. Because of their surface-active properties, the aminoethyl esters are also useful in preparing oil-in-water emulsions of insecticides and fungicides and in promoting the reaction of hydrophilic materials with hydrophobic materials. The carbobenzoxyaminoethyl esters of this invention are useful as a convenient source for the preparation of the corresponding aminoethyl esters.

The carbobenzoxyaminoethyl esters are quite stable and can be kept for long periods contrary to the aminoethyl esters. The former can be readily cleaved with phosphonium iodide when the aminoethyl esters are required. The carbobenzoxyaminoethyl esters are generally useful as intermediates from which to prepare many different glycerophosphoric acid derivatives.

The foregoing example indicates methods of purifying the product and intermediates. These steps can, of course, be omitted if it is not desired to obtain a chemically pure grade of material.

In a copending application, Serial No. 754,257, filed June 12, 1947, I have disclosed a method of preparing aminoethyl esters of diacyl-glycerophosphoric acids involving reaction of beta-hydroxyethylphthalimide with a diacyl-glycerophosphoryl chloride, followed by limited hydrolysis, and cleavage with hydrazine.

Having thus described the invention, what is claimed is:

1. A process comprising reacting a diacyl-glycerophosphoryl chloride, wherein the acyl radicals are aliphatic and contain at least 8 carbon atoms, with carbobenzoxyaminoethanol in the presence of a tertiary amine at a temperature of about from 10° C. to 35° C., subjecting the resulting carbobenzoxyaminoethyl ester of diacyl-glyceromonochlorophosphoric acid to limited hydrolysis by reaction with water at a temperature not exceeding about 25° C. to form the carbobenzoxyaminoethyl ester of diacyl-glycerophosphoric acid, and heating this last-formed ester with phosphonium iodide at a temperature of about from 25° C. to 50° C. to produce the aminoethyl ester of a diacyl-glycerophosphoric acid.

2. A process comprising an alpha, gamma-diacyl-glycerophosphoryl chloride, wherein the acyl radicals are aliphatic and contain at least 8 carbon atoms, with carbobenzoxyaminoethanol in the presence of a tertiary amine at a temperature of about from 10° C. to 35° C., subjecting the resulting carbobenzoxyaminoethyl ester of alpha, gamma-diacyl-glyceromonochlorophosphoric acid to limited hydrolysis by reaction with water at a temperature not exceeding about 25° C. to form the carbobenzoxyaminoethyl ester of alpha, gamma-diacyl-glycerophosphoric acid, and heating this last-formed ester with phosphonium iodide at a temperature of about from 25° C. to 50° C. to produce the aminoethyl ester of alpha, gamma-diacyl-glycerophosphoric acid.

3. A process comprising reacting alpha, gamma-dipalmitoglycerophosphoryl chloride with carbobenzoxyaminoethanol in the presence of a tertiary amine at a temperature of about from 10° C. to 35° C., subjecting the resulting carbobenzoxyaminoethyl ester of alpha-gamma-dipalmitoglyceromonochlorophosphoric acid to limited hydrolysis by reaction with water at a temperature not exceeding about 25° C. to form the carbobenzoxyaminoethyl ester of alpha, gamma-dipalmitoglycerophosphoric acid, and heating this last-formed ester with phosphonium iodide at a temperature of about from 25° C. to 50° C. to produce the aminoethyl ester of alpha, gamma-dipalmitoglycerophosphoric acid.

4. The process of claim 1 wherein the tertiary amine is pyridine.

5. A process comprising reacting a diacyl-glycerophosphoryl chloride, wherein the acyl radicals are aliphatic and contain at least 8 carbon atoms, with carbobenzoxyaminoethanol in the presence of a tertiary amine at a temperature of about from 10° C. to 35° C. and subjecting the resulting carbobenzoxyaminoethyl ester of diacyl-glycero-monochlorophosphoric acid to limited hydrolysis by reaction with water at a temperature not exceeding about 25° C. to form the carbobenzoxyaminoethyl ester of diacyl-glycerophosphoric acid.

6. A process comprising reacting an alpha, gamma-diacylglycerophosphoryl chloride, wherein the acyl radicals are aliphatic and contain at least 8 carbon atoms, with carbobenzoxyaminoethanol in the presence of a tertiary amine at a temperature of about from 10° C. to 35° C. and subjecting the resulting carbobenzoxyaminoethyl ester of alpha, gamma-diacyl-glyceromono-chlorophosphoric acid to limited hydrolysis by reaction with water at a temperature not exceeding about 25° C. to form the carbobenzoxyaminoethyl ester of alpha, gamma-diacyl-glycerophosphoric acid.

7. A process comprising reacting alpha, gamma - dipalmitoglycerophosphoryl chloride with carbobenzoxyaminoethanol in the presence of a tertiary amine at a temperature of about from 10° C. to 35° C. and subjecting the resulting carbobenzoxyaminoethyl ester of alpha, gamma - dipalmitoglyceromonochlorophosphoric acid to limited hydrolysis by reaction with water at a temperature not exceeding about 25° C. to form the carbobenzoxyaminoethyl ester of alpha, gamma-dipalmitoglycerophosphoric acid.

8. The process of claim 5 wherein the tertiary amine is pyridine.

9. A carbobenzoxyaminoethyl ester of a diacyl-glycerophosphoric acid wherein the acyl radicals are aliphatic and contain at least 8 carbon atoms.

10. A carbobenzoxyaminoethyl ester of an alpha, gamma-diacyl-glycerophosphoric acid wherein the acyl radicals are aliphatic and contain at least 8 carbon atoms.

11. Carbobenzoxyaminoethyl ester of dipalmitoglycerophosphoric acid.

12. Carbobenzoxyaminoethyl ester of alpha, gamma-dipalmitoglycerophosphoric acid.

13. A process comprising heating the carbobenzoxyaminoethyl ester of a diacyl-glycerophosphoric acid, wherein the acyl radicals are aliphatic and contain at least 8 carbon atoms, with phosphonium iodide at a temperature of about from 25° C. to 50° C. to produce the aminoethyl ester of a diacyl-glycerophosphoric acid.

14. A process comprising heating the carbobenzoxyaminoethyl ester of an alpha, gamma-diacyl-glycerophosphoric acid, wherein the acyl radicals are aliphatic and contain at least 8 carbon atoms, with phosphonium iodide at a temperature of about from 25° C. to 50° C. to produce the aminoethyl ester of an alpha, gamma-diacyl-glycerophosphoric acid.

15. A process comprising heating the carbobenzoxyaminoethyl ester of alpha, gamma-dipalmitoglycerophosphoric acid with phosphonium iodide at a temperature of about from 25° C. to 50° C. to produce the aminoethyl ester of alpha, gamma-dipalmitoglycerophosphoric acid.

WILLIAM GORDON ROSE.